UNITED STATES PATENT OFFICE.

RICHARD D. WINSHIP AND PHILIP E. SMITH, OF CHICAGO, ILLINOIS.

PROCESS OF MAKING COMPOSITION BUTTER.

1,028,804. Specification of Letters Patent. Patented June 4, 1912.

No Drawing. Application filed April 12, 1910. Serial No 554,936.

*To all whom it may concern:*

Be it known that we, RICHARD D. WINSHIP and PHILIP E. SMITH, citizens of the United States, residing at Chicago, in the county of Cook and State of Illinois, have invented certain new and useful Improvements in Processes of Making Composition Butter, of which the following is a specification.

Our invention relates to a process for making composition butter; the object of the invention is to make a composition butter of cheaper material than usually employed for the purpose, which is wholesome, agreeable to taste, and naturally the color and appearance of the pure butter.

In carrying our process into effect, we take equal parts, by weight, of a good quality of pure butter, or butter made from cream, and sweet milk, or cream; to this we add substantially as much of a neutral vegetable oil, such as cotton-seed oil, by weight, as there is of either butter or cream. After these three ingredients substantially in equal portions by weight have been put together, we then heat the ingredients to a temperature between 80 and 90 degrees F., and place them in a churn and violently agitate them and while being agitated, introduce air into the compound in a continuous stream. The air, in its passage through the agitated mass, tends to assist in the commingling and uniting of the ingredients. A portion of the air will escape from the agitated mixture and will carry off any disagreeable, deleterious, or noxious qualities or fumes that may be present in the materials, thus purifying and sweetening the product. A portion of the air will be entrapped and held in the compound, the surface tension of the fatty substances serving to retain it in proper quantities.

The substances are broken up by the violent agitation, and every particle thereof is exposed to the action of the air. All of the ingredients unite, forming innumerable globules thoroughly aerated, and so associated and comminuted as to form a mass of uniform color and consistency, in appearance and taste simulating the best of pure butter.

A churn well adapted for carrying our process into effect is disclosed in U. S. Patent No. 932,221, dated August 24th, 1909, to Richard D. Winship.

Having thus described our invention, what we claim is:

The process of making a composition butter which consists in mixing equal quantities by weight of sweet milk or cream, pure fresh butter, and a neutral vegetable oil; heating said mixture to a temperature between 80 and 90 degrees F.; thereafter placing the heated mixture in a churn and agitating said mixture; simultaneously aerating said agitated mixture with air, at atmospheric temperature, by forcibly introducing it therein in quantities proportional to the velocity of the agitating means, so that said air shall in some degree pass through said mixture to carry off noxious qualities and fumes, and in some degree remain entrapped in the compound by the surface tension of said vegetable oil; and continuing said aeration until said compound has been reduced in temperature to normal atmospheric temperature by contact of all parts thereof with said air.

In testimony whereof we hereunto set our hands.

RICHARD D. WINSHIP.
PHILIP E. SMITH.

In the presence of—
W. LINN ALLEN,
MARY F. ALLEN.